US008265206B2

(12) United States Patent
Mukai et al.

(10) Patent No.: US 8,265,206 B2
(45) Date of Patent: Sep. 11, 2012

(54) RADIO COMMUNICATION DEVICE AND RADIO COMMUNICATION METHOD

(75) Inventors: Hirohito Mukai, Tokyo (JP); Hidekuni Yomo, Tokyo (JP); Kiyotaka Kobayashi, Tokyo (JP); Yoshinori Kunieda, Fukuoka (JP)

(73) Assignee: Panasonic Corporation, Osaka (JP)

( * ) Notice: Subject to any disclaimer, the term of this patent is extended or adjusted under 35 U.S.C. 154(b) by 349 days.

(21) Appl. No.: 12/667,579

(22) PCT Filed: Jul. 3, 2008

(86) PCT No.: PCT/JP2008/001756
§ 371 (c)(1),
(2), (4) Date: Jan. 4, 2010

(87) PCT Pub. No.: WO2009/004812
PCT Pub. Date: Jan. 8, 2009

(65) Prior Publication Data
US 2010/0183102 A1 Jul. 22, 2010

(30) Foreign Application Priority Data
Jul. 5, 2007 (JP) ................................ 2007-177228

(51) Int. Cl.
*H04L 27/08* (2006.01)

(52) U.S. Cl. ........ 375/341; 375/144; 375/148; 375/340; 375/346; 375/348; 375/350; 375/351; 329/318; 329/319; 329/320; 455/63.1; 455/114.2; 455/278.1; 455/296

(58) Field of Classification Search .................. 375/144, 375/148, 346, 348, 340, 341, 350, 351; 329/318, 329/319, 320; 455/63.1, 114.2, 278.1, 296
See application file for complete search history.

(56) References Cited

U.S. PATENT DOCUMENTS 6,219,334 B1 * 4/2001 Sato et al. ..................... 370/210
7,023,903 B2 * 4/2006 Karna .......................... 375/147
2008/0008258 A1 * 1/2008 Tanabe ......................... 375/267

FOREIGN PATENT DOCUMENTS

| JP | 2003-348045 | 12/2003 |
| JP | 2006-13680 | 1/2006 |
| JP | 2007-96658 | 4/2007 |

OTHER PUBLICATIONS

International Preliminary Report on Patentability issued Feb. 4, 2010 in International (PCT) Application No. PCT/JP2008/001756.
International Search Report issued Oct. 14, 2008 in International (PCT) Application No. PCT/JP2008/001756.
Takeo Ohgane et al., "A Study on a Channel Allocation Scheme with an Adaptive Array in SDMA", IEEE $47^{th}$ VTC, pp. 725-729, vol. 2 (1997).

* cited by examiner

*Primary Examiner* — Sam K Ahn
*Assistant Examiner* — Sophia Vlahos
(74) *Attorney, Agent, or Firm* — Wenderoth, Lind & Ponack, L.L.P.

(57) ABSTRACT

A radio receiver which performs iterative decoding of a received signal is provided. The radio receiver comprises: a receiving unit receiving a signal on a symbol-by-symbol basis; a demodulation unit (303) demodulating the received signal; a last symbol timing generation unit (308) generating a last symbol timing signal on the basis of the signal demodulated by the demodulation unit (303); a modulation unit (304) modulating the signal demodulated by the demodulation unit (303); and a cancellation unit (306) cancelling an interference component of the received signal using a replica signal generated on the basis of the signal modulated by the modulation unit (304). The modulation unit (304) controls the timing of rearrangement of a data sequence on the basis of the timing of the last symbol. Thus, a radio receiver in which the receiving processing time is reduced can be provided.

7 Claims, 11 Drawing Sheets

[Fig. 1]
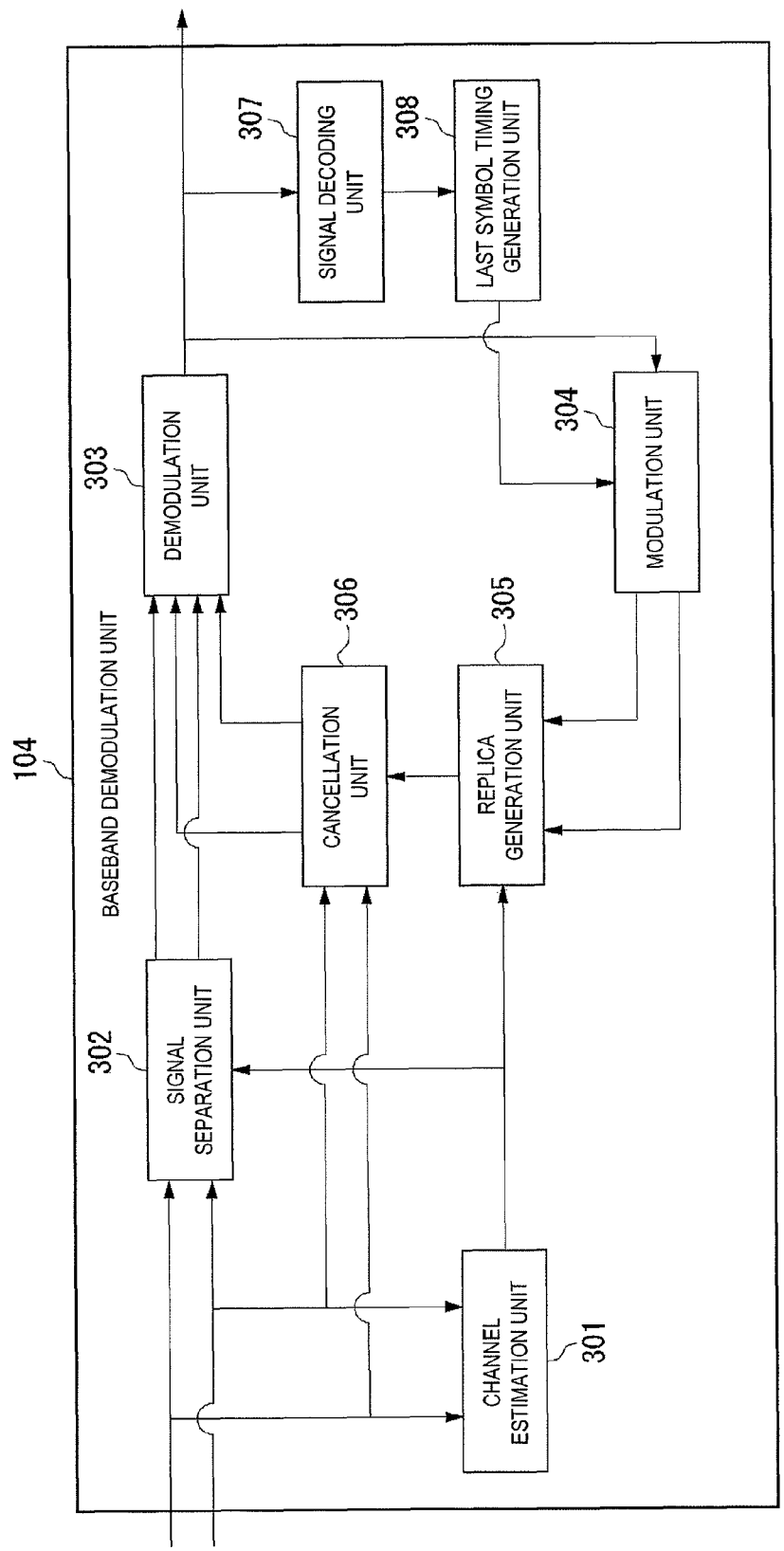

[Fig. 2]
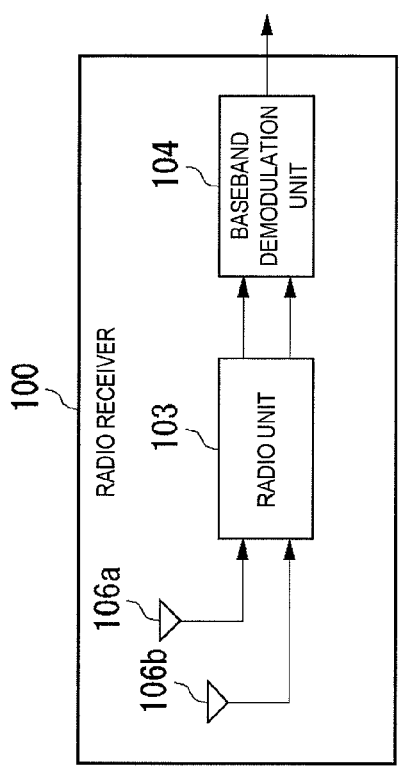
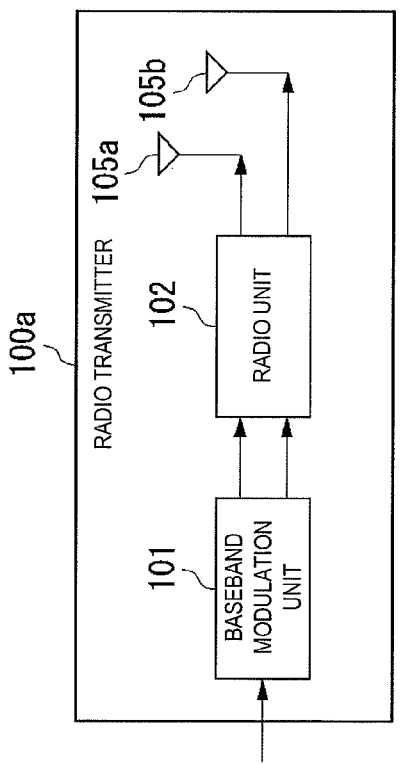

[Fig. 3]
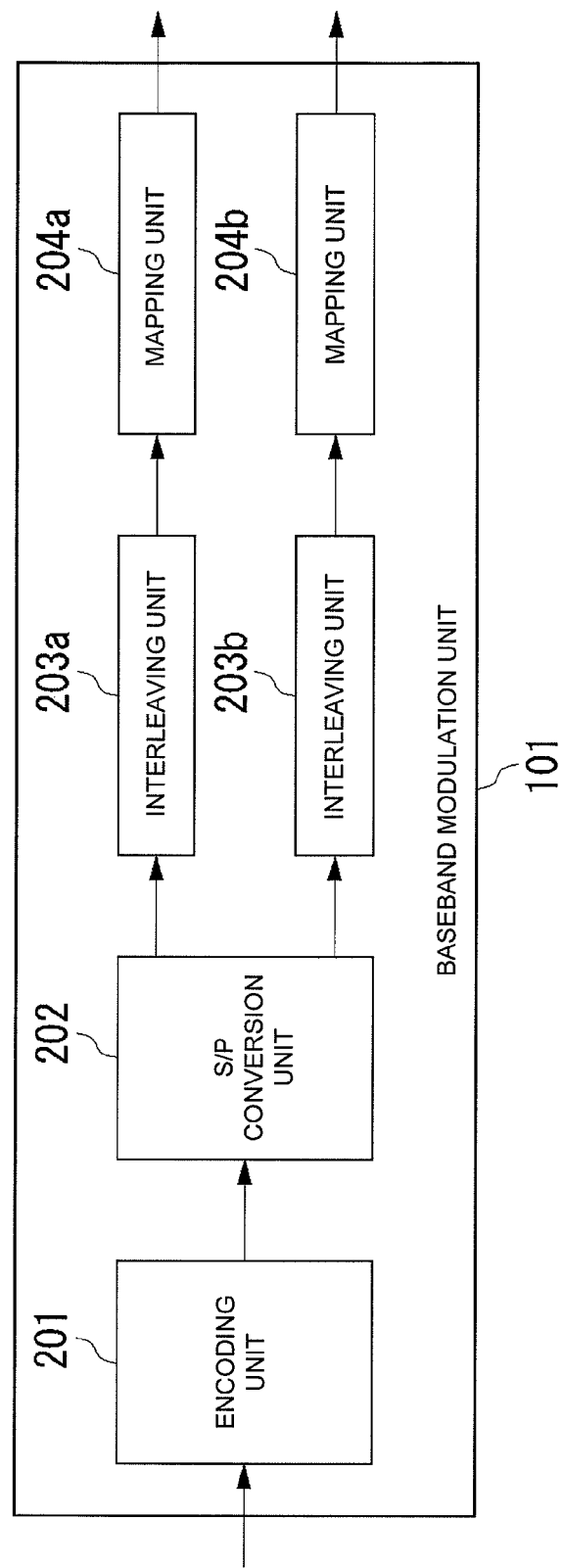

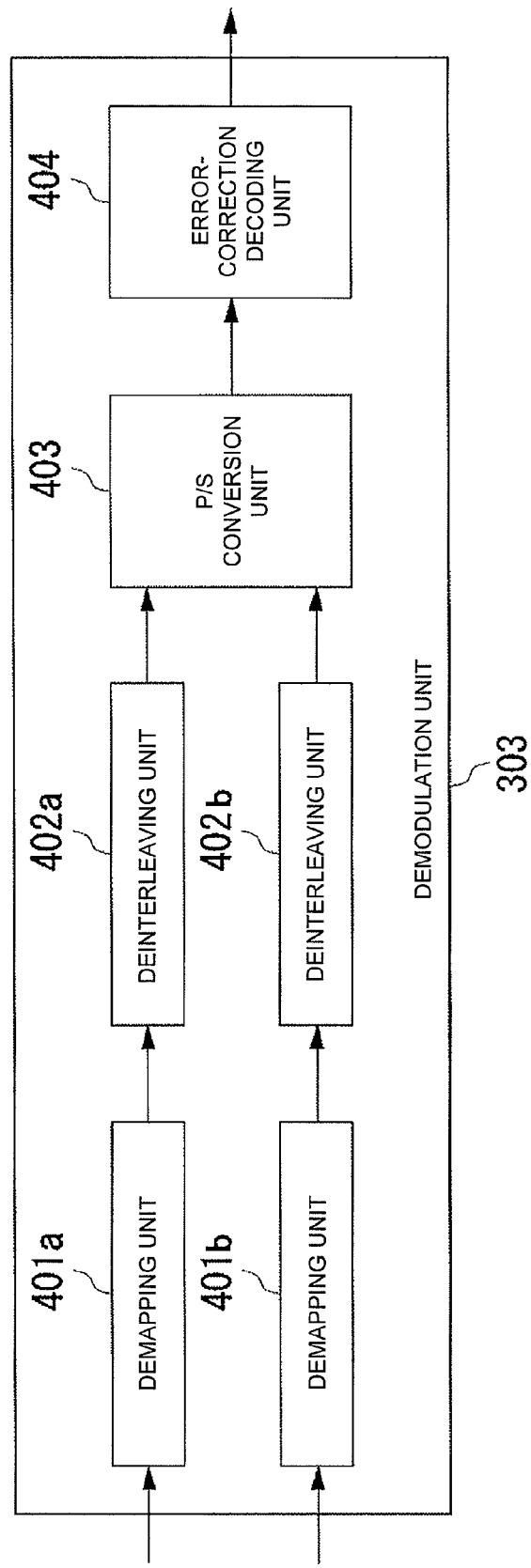

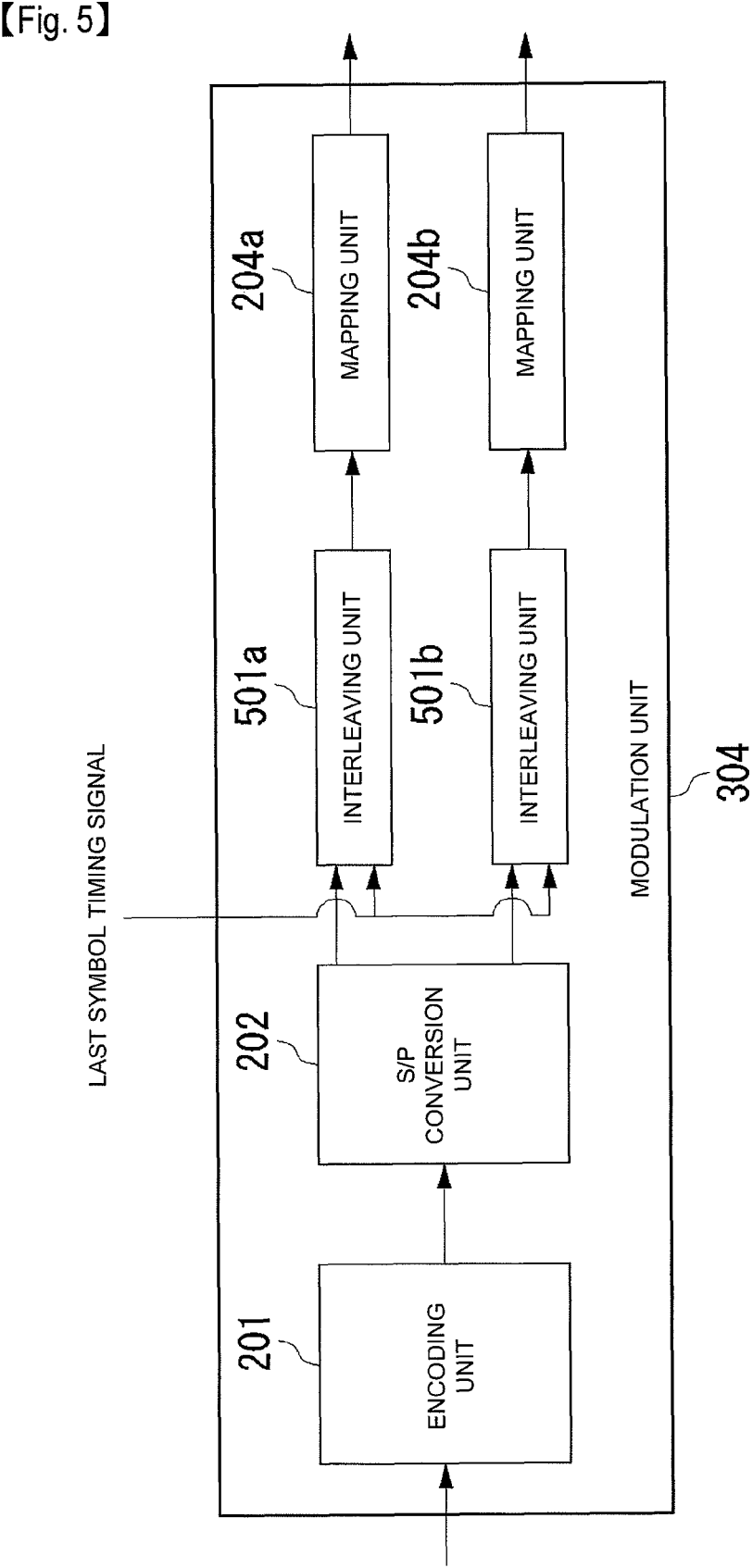
[Fig. 5]

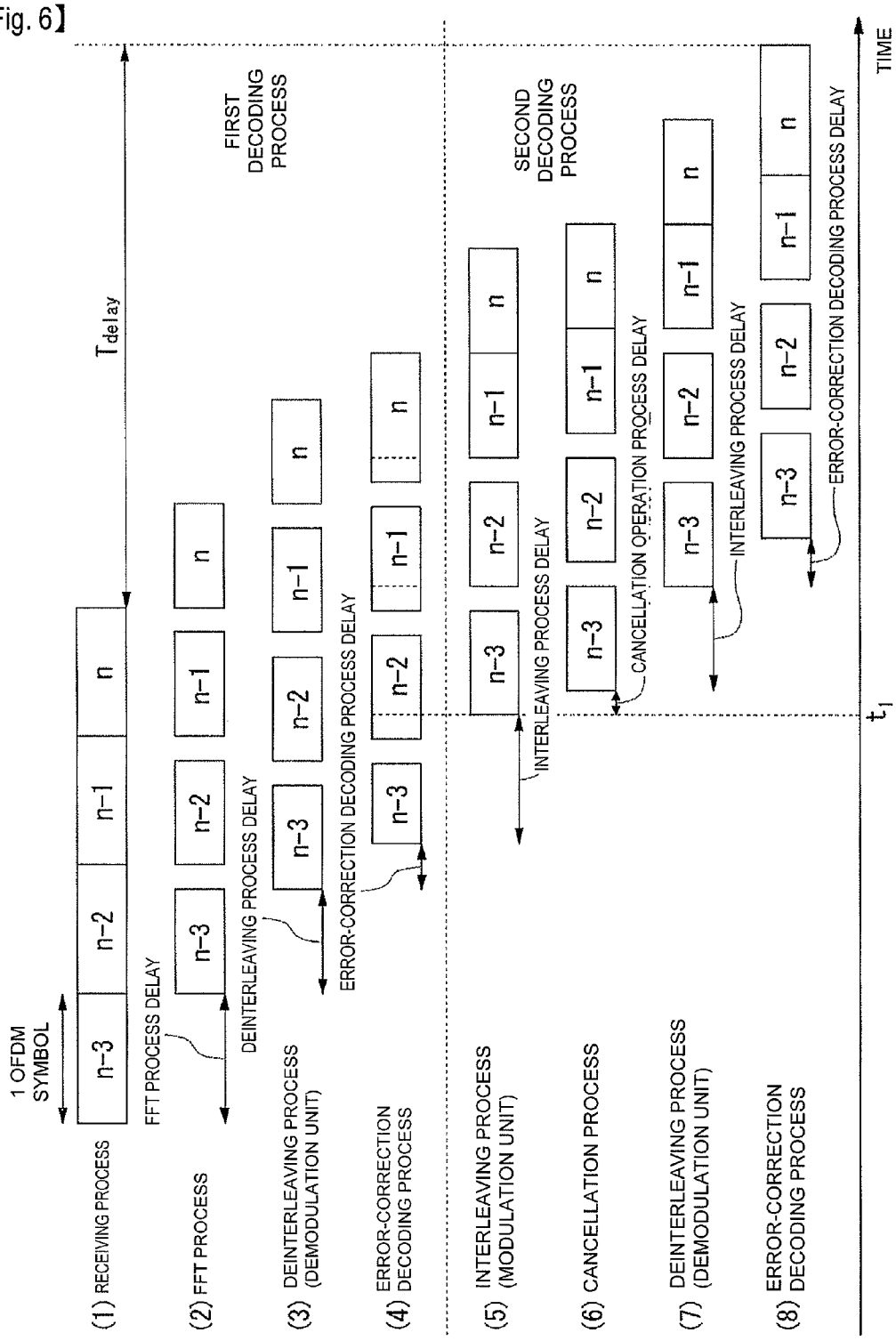

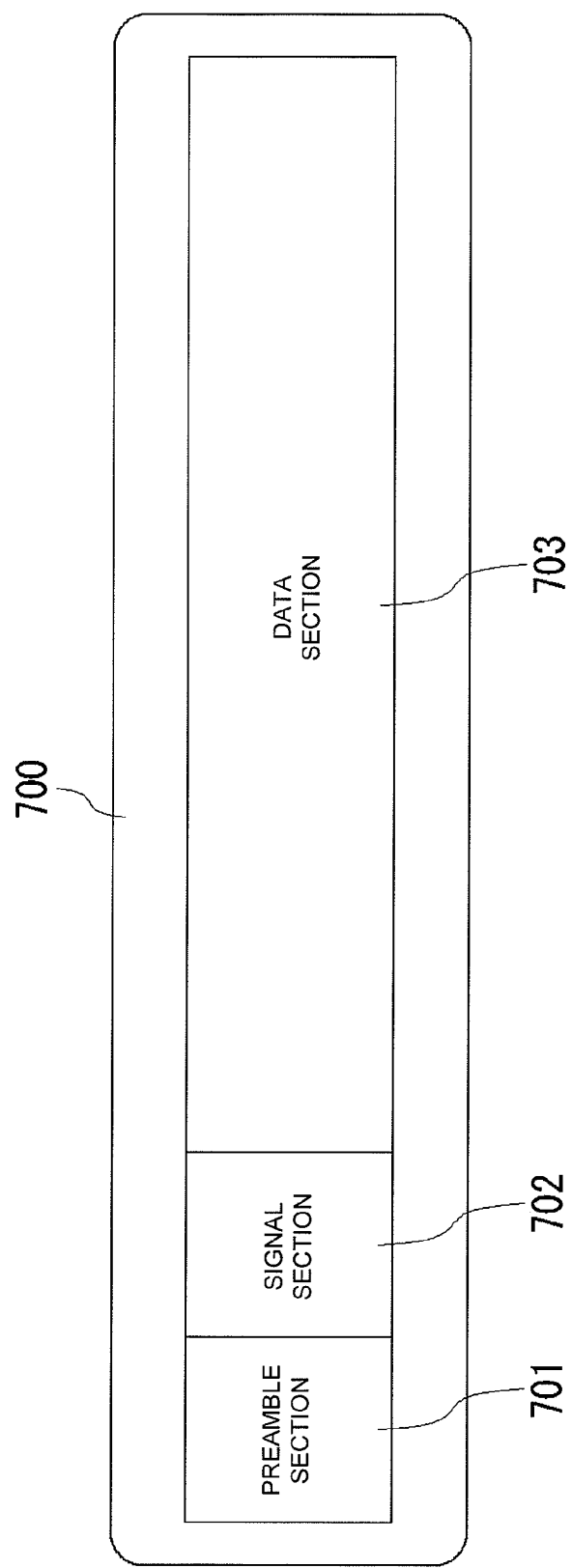
[Fig. 7]

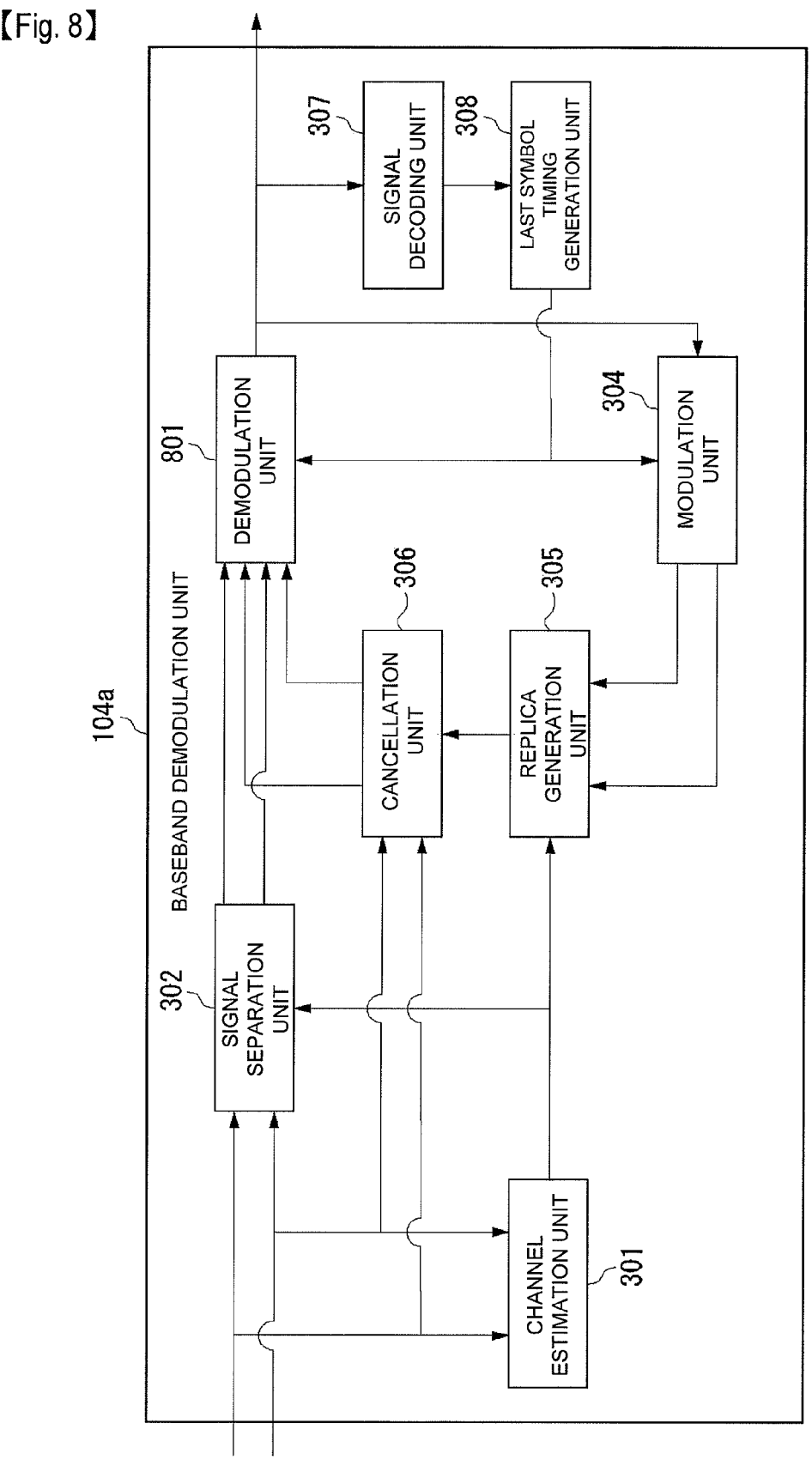
[Fig. 8]

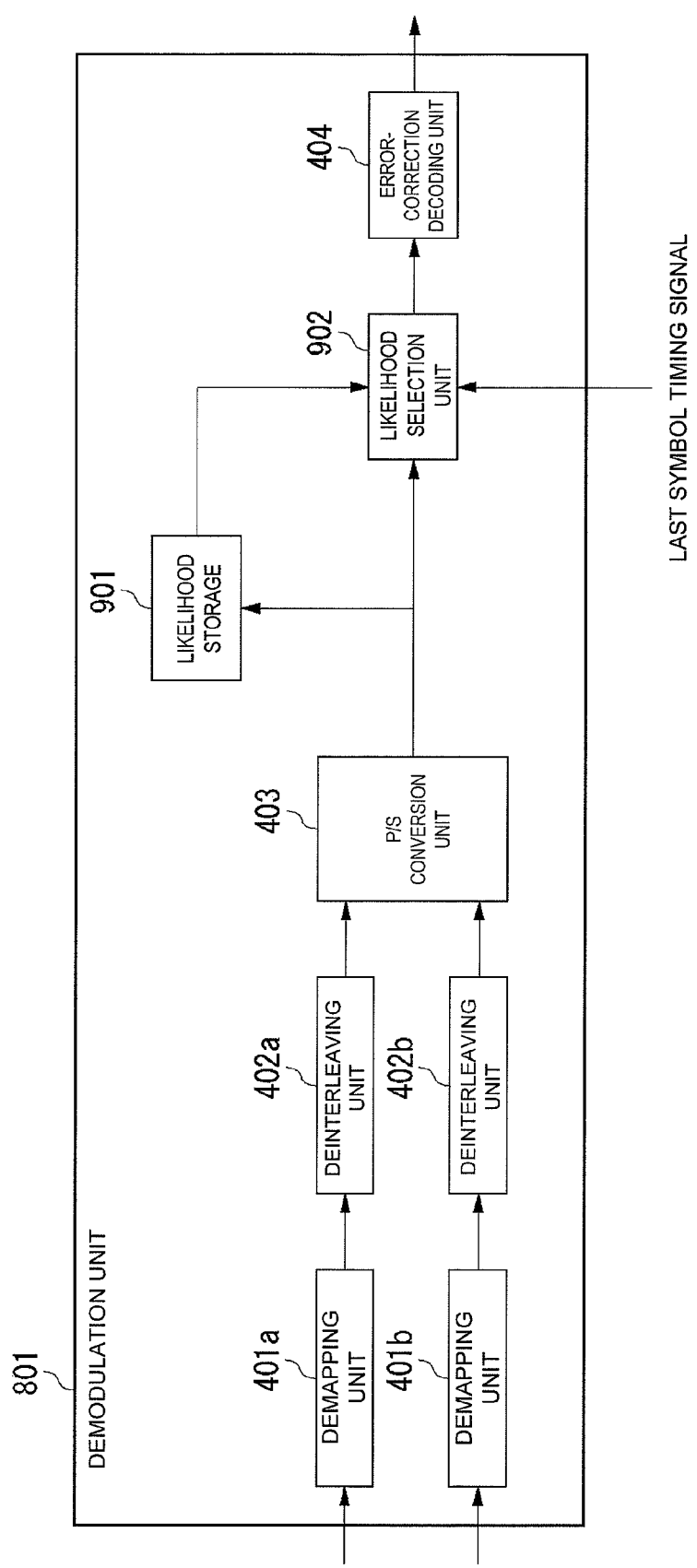
[Fig. 9]

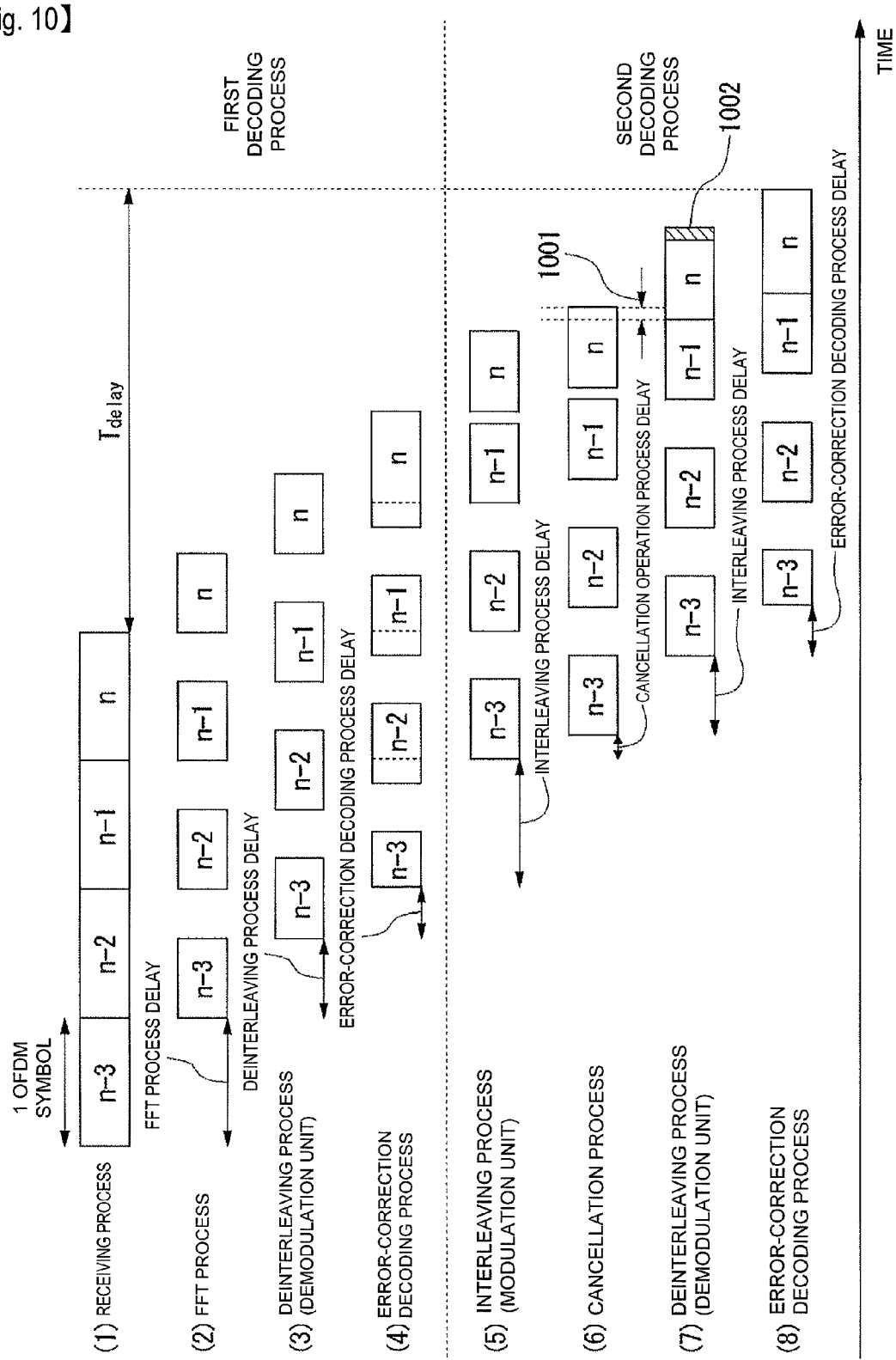
[Fig. 10]

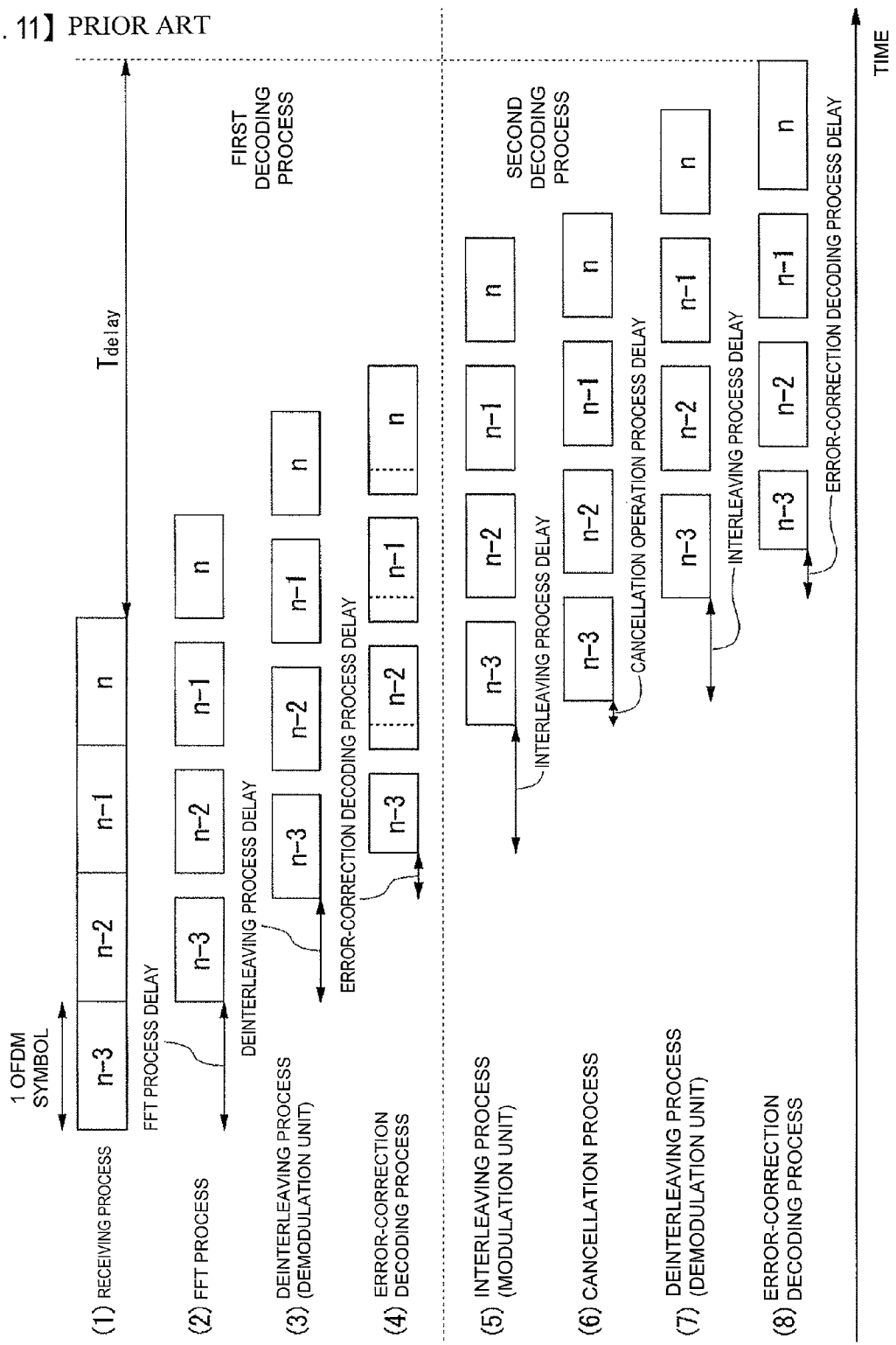
[Fig. 11] PRIOR ART

RADIO COMMUNICATION DEVICE AND RADIO COMMUNICATION METHOD

CROSS REFERENCE TO RELATED APPLICATION

This application is based upon and claims the benefit of priority from the prior Japanese Patent Application No. 2007-177228, filed on Jul. 5, 2007, the entire contents of which are incorporated herein by reference.

TECHNICAL FIELD

The present invention relates to a radio communication device performing iterative decoding of a received radio signal.

BACKGROUND ART

As the demand for increasing transmission rates of radio communication grows, techniques that make effective use of the finite frequency range to increase transmission rates are being widely studied. One of such techniques to increase transmission rates is MIMO (Multiple-Input Multiple-Output) transmission technology. In the MIMO transmission technology, a radio transmitter uses multiple transmit antennas to transmit different streams of data using the same frequency channel. A radio receiver uses multiple receive antennas to receive spatially multiplexed data and separates the data by signal processing. This can increase the transmission rate without broadening the frequency bandwidth.

In order to improve reception characteristics in the MIMO transmission technology, a number of receiving schemes that separate spatially multiplexed signals have been proposed. Known examples include ZF (Zero-Forcing), MMSE (Minimum Mean Square Error), MLD (Maximum Likelihood Detection), and iterative decoding.

The receiving schemes using iterative decoding can be classified as parallel interference canceller (PIC) which removes interference components from a received signal in parallel or as successive interference canceller (SIC) which successively removes interference components from a received signal and demodulates the signal. T. Ohgane et al., "A study on a channel allocation scheme with an adaptive array in SDMA", IEEE 47th VTC, pp. 725-729, vol. 2 (1997) discloses a parallel interference canceller.

These approaches can be further classified as hard canceller or soft canceller. The hard canceller makes hard decision on a tentative decision result in the course of iterative decoding; the soft canceller uses a soft decision value as a tentative decision result. The hard canceller has an advantage that the hard canceller can make the circuit size smaller than the soft canceller because of its circuit configuration.

DISCLOSURE OF THE INVENTION

Problem to be Solved by the Invention

The parallel interference canceller performs remodulation using a demodulated tentative decision result to generate a replica signal, uses the replica signal to cancel interference components of the received signal, and demodulates the resulting signal again. The parallel interference canceller repeats the process sequence to improve the reception characteristics. The iterative decoding receiving scheme of the parallel interference canceller entails a large receiving process delay because of the repeated sequence of demodulation, interference cancellation and demodulation.

It has been decided that MIMO transmission will be used as a transmission rate enhancement technology in IEEE 802.11n, which is a standard being developed. IEEE 802.11n relates to packet transmission. IEEE 802.11n requires a radio receiver to return an acknowledgement indicating that the radio receiver has successfully received packets to the radio transmitter. Since a time limit by which the acknowledgement is to be returned is specified, the radio receiver needs to complete receiving processing by the time limit. Therefore, there is need to minimize receiving processing delay.

The present invention has been made in view of the circumstances described above and an object of the present invention is to provide a radio receiver in which receiving processing time is reduced.

Means for Solving the problem

A radio receiver according to the present invention performs iterative decoding of a received signal. The radio receiver comprises: a receiving unit receiving a signal on a symbol-by-symbol basis; a demodulation unit demodulating the received signal; a last symbol timing generation unit generating a last symbol timing signal indicating the timing of a last symbol on the basis of the signal demodulated by the demodulation unit; a modulation unit modulating the signal demodulated by the demodulation unit; and an interference cancellation unit cancelling an interference component of the received signal by using a replica signal generated on the basis of the signal modulated by the modulation unit; wherein the modulation unit controls the timing of rearrangement of a data sequence on the basis of the last symbol timing signal.

A radio receiving method according to the present invention for performing iterative decoding of a received signal comprises the steps of: receiving a signal on a symbol-by-symbol basis; demodulating the received signal; generating a last symbol timing signal indicating the timing of a last symbol on the basis of the demodulated signal; modulating the demodulated signal to generate a modulated signal while controlling the timing of rearrangement of a data sequence on the basis of the last symbol timing signal; and cancelling an interference component of the received signal by using a replica signal generated on the basis of the modulated signal.

As will be described below, there are other modes of the present invention. Therefore, the disclosure of the present invention is intended to provide some modes of the present invention and is not intended to limit the scope of the present invention described and claimed.

BRIEF DESCRIPTION OF THE DRAWINGS

FIG. 1 is a diagram illustrating a configuration of a baseband demodulation unit of a radio receiver;

FIG. 2 is a diagram illustrating a configuration of a radio communication system according to a first embodiment;

FIG. 3 is a diagram illustrating a configuration of baseband demodulation unit of a radio transmitter;

FIG. 4 is a diagram illustrating a configuration of a demodulation unit of the baseband demodulation unit of the radio receiver;

FIG. 5 is a diagram illustrating a configuration of a modulation unit of the baseband demodulation unit of the radio receiver;

FIG. 6 is a diagram illustrating timings of signal processes in the radio receiver;

FIG. 7 is a diagram illustrating a transmitted packet format;

FIG. 8 is a diagram illustrating a configuration of a baseband demodulation unit according to a second embodiment;

FIG. 9 is a diagram illustrating a demodulation unit of the baseband demodulation unit according to the second embodiment;

FIG. 10 is a diagram illustrating timings of signal processes in the radio receiver according to the second embodiment; and FIG. 11 is a diagram illustrating timings of signal processes in a conventional radio receiver.

BEST MODE FOR CARRYING OUT THE INVENTION

The present invention will be described in detail. It will be understood that the embodiments described below are illustrative only and various variations of the present invention are possible. Therefore specific configurations and functions disclosed herein are not intended to limit the scope of the claims.

A radio receiver according to an embodiment performs iterative decoding of a received signal. The radio receiver comprises: a receiving unit receiving a signal on a symbol-by-symbol basis; a demodulation unit demodulating the received signal; a last symbol timing generation unit generating a last symbol timing signal indicating the timing of a last symbol on the basis of the signal demodulated by the demodulation unit; a modulation unit modulating the signal demodulated by the demodulation unit; and an interference cancellation unit cancelling an interference component of the received signal by using a replica signal generated on the basis of the signal modulated by the modulation unit; wherein the modulation unit controls the timing of rearrangement of a data sequence on the basis of the last symbol timing signal.

By determining whether a symbol to be re-modulated in the modulation unit is the last symbol or not on the basis of the last symbol timing and controlling the timing of rearrangement of a data sequence on the basis of whether the symbol is the last symbol or not, rearrangement of the data sequence for the last symbol can be started at earlier timing than others. Consequently, the radio receiver of the present embodiment can start modulation of the last symbol earlier than a conventional radio receiver and accordingly can reduce receiving process time.

In the radio receiver according to the present embodiment, the demodulation unit comprises an error-correction decoding unit performing error-correction decoding of a symbol using a portion of data included in a next symbol; and, for a symbol that is not a last symbol, the modulation unit starts rearrangement of a data sequence after predetermined time has elapsed since the completion of input of a result of processing of the symbol, and when the modulation unit determines, on the basis of the last symbol timing, that a symbol is a last symbol, the modulation unit may start rearrangement of a data sequence at the timing when the modulation unit has detected completion of input of a result of processing of the last symbol.

When demodulation unit uses a portion of data contained in the next symbol to perform error-correction decoding as described above, the result of decoding of one symbol cannot be obtained until completion of processing of the data contained in the next symbol. Therefore, the demodulation unit starts rearrangement of the data sequence after a predetermined time has elapsed since completion of input of the result of processing of the symbol. In the case of the last symbol, there is not the next symbol and error-correction decoding can be performed without having to use data contained in the next symbol. Therefore, if the current symbol is the last symbol, rearrangement of the data sequence is started upon completion of input of the result of processing of the symbol. Conventionally, rearrangement of a data sequence is started at identical timing regardless of whether a symbol is the last one or not. With the configuration of the present embodiment, rearrangement of the data sequence for the last symbol can be started without requiring a waiting period. Accordingly, the time between the reception of the last symbol and the completion of the modulation process can be reduced.

In the radio receiver according to the present embodiment, the demodulation unit comprises a likelihood storage for storing a likelihood used by the error-correction decoding unit for the previous decoding; and a likelihood selection unit selecting, on the basis of the last symbol timing, a likelihood obtained in the previous decoding or a likelihood obtained in the current decoding; and the likelihood selected by the likelihood selection unit may be input in the error-correction decoding unit.

With this configuration, the demodulation unit can start error-correction decoding of the last symbol using the likelihood stored in the likelihood storage. Accordingly, the time of calculating the likelihood for the current decoding can be saved and therefore the time required for decoding process can be reduced. Consequently, the receiving process time can be reduced. The present embodiment is effective especially if the operation clock rate of the radio receiver is high. If the operation clock rate is high, the process for calculating the likelihood for the last symbol but one is completed earlier, therefore a wait time occurs between the completion of the process for the symbol and the start of the process for calculating the likelihood for the last symbol. In such a case, the previously obtained likelihood can be used to perform the next process to eliminate the wait time.

The receiving unit in the radio receiver according to the present embodiment may receive a spatially multiplexed signal. The radio receiver may comprise a signal separation unit separating a signal received by the receiving unit. The signal separated by the signal separation unit may then be input into the demodulation unit.

With this configuration, the radio receiver can be applied to MIMO transmission where multiple signals are transmitted in a multiplexed manner.

A radio receiving method according to the present embodiment for performing iterative decoding of a received signal comprises the steps of: receiving a signal on a symbol-by-symbol basis; demodulating the received signal; generating a last symbol timing signal indicating the timing of a last symbol on the basis of the demodulated signal; modulating the demodulated signal to generate a modulated signal while controlling the timing of rearrangement of a data sequence on the basis of the last symbol timing signal; and cancelling an interference component of the received signal using a replica signal generated on the basis of the modulated signal.

With this configuration, as with the radio receiver according to the present embodiment, the rearrangement of the data sequence for the last symbol can be started at an earlier timing than other symbols and accordingly the time required for receiving process can be reduced.

Radio receivers according to embodiments of the present invention will be described with reference to drawings.

First Embodiment

FIG. 1 illustrates a configuration of a baseband demodulation unit 104 of a radio receiver 100 according to a first embodiment. Before turning to a detailed description of the radio receiver 100 in FIG. 1, a radio communication system to which the radio receiver 100 of the present embodiment is applied will be described.

FIG. 2 illustrates a configuration of a radio communication system of the first embodiment. The radio communication system comprises a radio transmitter 100a and a radio receiver 100. The radio transmitter 100a comprises M antennas and the radio receiver 100 comprises Nr antennas. In the present embodiment, MIMO (Multiple-Input Multiple-Output) transmission is performed in which the M transmit antennas and the Nr receive antennas are used to transmit multiple (for example M) stream signals in the same frequency channel to achieve spatial multiplexing transmission.

The system will be described with respect to an example in which two transmit antennas and two receive antennas are used. However, the number of antennas is not limited to this. Any number of antennas may be used that satisfies the condition $1 \leq M \leq Nr$.

(Configuration of Radio Transmitter)

The radio transmitter 100a comprises a baseband modulation unit 101, a radio unit 102, and transmit antennas 105a and 105b.

Data to be transmitted by the radio transmitter 100a is input in the baseband modulation unit 101. The baseband modulation unit 101 applies processing such as coding, interleaving, and mapping to the input data and outputs a baseband-modulated signal.

The radio unit 102 receives the baseband signal output from the baseband modulation unit 101. The radio unit 102 applies processing such as frequency conversion and amplification to the input baseband signal and outputs a radio signal with a radio frequency resulting from the frequency conversion from the baseband signal. The radio signal output from the radio unit 102 is transmitted through the transmit antennas 105a and 105b into space.

FIG. 3 illustrates a configuration of the baseband modulation unit 101 of the radio transmitter 100a in detail. The radio transmitter 100a comprises an encoding unit 201, a serial-to-parallel conversion unit (hereinafter referred to as the "S/P conversion unit") 202, two interleaving units 203a and 203b, and two mapping units 204a and 204b associated with the interleaving units 203a and 203b, respectively.

Input into the encoding unit 201 is a bit data sequence z(k) to be transmitted by the radio transmitter 101, where k represents discrete time. The encoding unit 201 applies error-correction coding to the input bit data sequence z(k) with a predetermined coding rate and outputs an error-correction-coded code sequence d(k).

The S/P conversion unit 202 receives the error-correction-coded signal d(k) output from the error-correction encoding unit 201. The S/P conversion unit 202 applies serial-to-parallel conversion to the signal d(k) and outputs a serial-to-parallel-converted data sequence $d_m(k)$ to the interleaving units 203a and 203b.

The interleaving unit 203a receives the serial-to-parallel converted data sequence $d_m(k)$. The interleaving unit 203a interleaves the received data sequence $d_m(k)$ to rearrange the data sequence and outputs the rearranged data sequence. The interleaving unit 203b performs the same processing and outputs rearranged data. The interleaving units 203a and 203b may use different rearrangement rules.

The mapping unit 204a receives data output from the interleaving unit 203a. The mapping unit 204a maps the input data to a point on a complex plane consisting of I (In-phase) and Q (Quadrature-phase) signals using a given modulation scheme, and outputs a mapped signal $x_m(k)$. The mapping unit 204b performs the same processing and outputs a mapped signal.

(Configuration of Radio Receiver)

The radio receiver 100 has a configuration for performing iterative decoding using parallel interference canceller (PIC). As illustrated in FIG. 2, the radio receiver 100 comprises multiple receive antennas 106a and 106b, a radio unit 103, and a baseband demodulation unit 104.

A radio signal received at the receive antennas 106a and 106b are input in the radio unit 103. The radio unit 103 applies processing such as amplification and frequency conversion to the radio signal and outputs a baseband signal converted from the radio-frequency signal.

The baseband demodulation unit 104 receives the baseband signal output from the radio unit 103. The baseband demodulation unit 104 applies processing such as signal separation and demapping, deinterleaving, and error-correction decoding to the input spatially multiplexed baseband signal and outputs decoded data.

FIG. 1 illustrates a configuration of the baseband demodulation unit 104 of the radio receiver 100 in detail. A signal amplified and subjected to processing such as frequency conversion by the radio unit 103 and then converted to a digital signal by an A-D conversion unit circuit is input into the baseband demodulation unit 104.

A baseband signal received by the nr-th receive antenna is denoted by $y_{nr}(k)$. A signal $x_m(k)$ transmitted from the m-th antenna of the radio transmitter 100a is received by the radio receiver 100. The signal y(k) received by the radio receiver 100 can be expressed as

[Expression 1]

$$y(k)=Hx(k)+n(k) \quad (1)$$

Here, y(k) is a column vector representing nr receive antennas and each element of the column vector is denoted by $y_{nr}(k)$. H represents fading experienced by a signal x(k) transmitted from the transmitter 100a over the transmission channel and is a matrix of M rows and Nr columns determined by the number M of the transmit antennas and the number Nr of the receive antennas. Letting $h_{ij}$ denote the i-th row in the j-th column of H, then $h_{ij}$ represents channel fading experienced by a signal transmitted from the j-th transmit antenna and received by the i-th receive antenna.

Here, n(k) represents thermal noise added when a signal is received by nr antennas and is a column vector consisting of nr elements. It is assumed here that the thermal noise is white noise with noise power σ expressed as

[Expression 2]

$$E[n(k)^H n(k)] = \sigma I_{nr} \quad (2)$$

where $I_{nr}$ is a unitary matrix of order Nr and E[x] is an expected value of x.

Returning to FIG. 1, description of the baseband demodulation unit 104 will be continued. A baseband signal $y_{nr}(k)$ is input in a channel estimation unit 301. The channel estimation unit 301 uses a known preamble signal included in $y_{nr}(k)$ to perform transmission channel estimation and outputs a transmission channel fading estimation value B (hereinafter referred to as the channel estimation value). While a known preamble signal is used in this example, the signal that can be used for transmission channel estimation is not limited to a preamble signal. Any known signal, for example a pilot signal, may be used for the transmission channel estimation.

The baseband signal $y_{nr}(k)$ and channel estimation value B are input in a signal separation unit 302. The signal separation unit 302 uses the channel estimation value B to generate a separation weight for separating signals transmitted in the same frequency channel in a spatially multiplexed manner. The separation weight $w_m$ may be calculated using a method such as ZF (Zero Forcing) or MMSE (Minimum Mean Square Error), for example. The signal separation unit 302 multiplies the baseband signal $y_{nr}(k)$ by the separation weight to equalize amplitude and phase fading experienced by the signals over the transmission channel and outputs the resulting signal $s_m(k)$. The signal separation unit 302 multiples the received signal $y(k)$ by the separation weight $w_m$ to remove an interference component of another stream signal from the spatially multiplexed signal to obtain a signal $s_m(k)$ as

[Expression 3]

$$s_m(k) = W_m^T y(k) \quad (3)$$

where $w_m$ is a column vector having nr elements and T represents the transpose of the vector $w_m$.

Since the number of transmit antennas M=2 and the number of receive antennas Nr=2 in the present embodiment, the spatially multiplexed signal separation weight can be expressed in the ZF method by the inverse matrix of the channel estimation value B as

[Expression 4]

$$\begin{bmatrix} s_1(k) \\ s_2(k) \end{bmatrix} = \begin{bmatrix} W_1^T \\ W_2^T \end{bmatrix} y(k) = B^{-1} y(k). \quad (4)$$

A demodulation unit 303 will be descried next. The demodulation unit 303 receives the signal $s_m(k)$ output from the signal separation unit 302 or a signal output from a cancellation unit 306. The output signal from the cancellation unit 306 will be described later. The radio receiver 100 according to the present embodiment performs iterative decoding, where decoding and interference cancellation is repeated. The radio receiver 100 uses the signal output from the signal separation unit 302 for the first decoding and uses the signal input from the cancellation unit 306 for the second and subsequent decoding.

The demodulation unit 303 applies processing such as demapping, deinterleaving, and error-correction decoding to the signal $s_m(k)$ input from the signal separation unit 302 and outputs a decoded tentative decision bit sequence b[0](k).

FIG. 4 illustrates a configuration of the demodulation unit 303. The configuration in FIG. 4 is illustrative only. The radio receiver 100 of the present embodiment can use a configuration different from the one illustrated in FIG. 4.

In FIG. 4, the demodulation unit 303 comprises demapping units 401a and 401b, deinterleaving units 402a and 402b, a parallel-to-serial conversion unit (hereinafter referred to as the P/S conversion unit) 403, and an error-correction decoding unit 404.

The demodulation unit 303 receives a signal $s_m(k)$ separated from spatially multiplexed streams by the signal separation unit 302 or a combined interference cancelled signal $u_m^{[l]}(k)$ input from the cancellation unit 306. Here, l is a natural number greater than or equal to 1 representing the number of iterations of the canceller. Specifically, l=1, . . . . The signal $s_m(k)$ output from the signal separation unit 302 or the interference cancelled signal $u_m^{[l]}(k)$ output from the cancellation unit 306 is mapped to the complex plane consisting of I and Q signals.

The demapping units 401a and 401b perform demapping, where the input signal $s_m(k)$ or $u_m^{[l]}(k)$ mapped to the complex plane is converted to a bit data sequence consisting of a sequence of bits. In the present embodiment, a signal $s_1(k)$ or $u_1^{[l]}(k)$ is input into the demapping unit 401a and a signal $s_2(k)$ or $u_2^{[l]}(k)$ is input into the demapping unit 401b. The output of the demapping may be a hard decision value which is the bit of a candidate signal point that is closest in distance to the received signal point or a soft decision value which is the likelihood of each bit of a received signal point and a candidate signal point. The latter method of outputting a soft decision value will be described as an example in the present embodiment.

As the likelihood of each bit, the log likelihood ratio LLR is calculated. A method for calculating the LLR is described for example in Mihei, "Digital Wireless Transmission Technology" (Pearson Education Japan), pp. 275-279.

For the input signal $s_m(k)$ or $u_m^{[l]}(k)$, the log likelihood ratio $LLR_{m,i}(k)$ of the i-th bit is obtained by

[Expression 5]

$$LLR_{m,i}(k) = \left[ \min_{c \in L} |s_m(k) - s_c^{(bi=0)}|^2 - \min_{c \in L} |s_m(k) - s_c^{(bi=1)}|^2 \right] \quad (5)$$

Here, L is the modulation multi-valued number of the input signal, $s_c(bi=A)$ is a set of candidate signal points where the i-th bit is A among the candidate signal points on the complex plane used in mapping. Here, A is 0 or 1, i is a natural number less than or equal to log 2(L), and m is a natural number less than or equal to M.

The demapping units 401a and 401b output the log likelihood ratio $LLR_{m,i}(k)$ calculated according to Equation (5).

The log likelihood ratio $LLR_{m,i}(k)$ output from the demapping unit 401a is input into the deinterleaving unit 402a. The deinterleaving unit 402a performs on an input sequence the reverse of the rearrangement performed in the interleaving to rearrange the data sequence rearranged in the interleaving to recover the original sequence. The deinterleaving unit 402a outputs the rearranged sequence. The deinterleaving unit 402b performs the same processing as the deinterleaving unit 402a and outputs rearranged data. If the transmitter has used different rearrangement patterns for different streams, the deinterleaving units 402a and 402b rearrange the data sequences in the reverse patterns of their respective interleaving patterns.

Data sequences output from the deinterleaving units 402a and 402b are input in parallel into the P/S conversion unit 403. The P/S conversion unit 403 converts the input data sequences into data sequences rearranged in series according to a predetermined procedure and outputs the converted data sequences. The procedure used by the P/S conversion unit 403 to rearrange the input data is the reverse of the procedure performed by the S/P conversion unit 202 of the radio transmitter 100a.

The log likelihood ratio output from the P/S conversion unit 403 is input into the error-correction decoding unit 404. The error-correction decoding unit 404 error-correction-decodes the input log likelihood ratio. For example, the error-correction decoding unit 404 uses Viterbi decoding algorithm for the error-correction decoding. The error-corrected data sequence is output as a binary hard decision value bit sequence b(k). The configuration of the demodulation unit 303 has been described so far.

A signal decoding unit 307 decodes information such as a packet length and transmission rate of a data section contained in a transmitted signal. The signal decoding unit 307 extracts a predetermined section of a tentative decision bit sequence output from the demodulation unit 303 and outputs a packet information signal providing information such as the packet length and transmission rate.

FIG. 7 illustrates a format of a transmitted packet in the present embodiment. As illustrated in FIG. 7, the transmitted packet 700 includes a preamble section 701, a signal section 702, and a data section 703.

The preamble section 701 consists of a known signal used in the radio receiver 100 for synchronization, channel estimation, frequency offset estimation, and other processing. The signal section 702 contains information such as the modulation scheme, coding rate, and data length (packet length) of the data section 703 that follows. The information in the signal section 702 has been modulated using a predetermined modulation scheme and coding rate. The data section 703 contains modulated data to be transmitted from the radio transmitter 100a to the radio receiver 100.

The signal decoding unit 307 uses the packet length information contained in the signal section 702 of the received signal to calculate the number of symbols contained in the packet.

The last symbol timing generation unit 308 uses the packet information signal output from the signal decoding unit 307 to calculate the number of symbols constituting the received packet. The last symbol timing generation unit 308 calculates the number of symbols $N_{symbol}$ constituting he received packet by

[Expression 6]

$$N_{symbol} = \frac{N_{LENGTH}}{N_{sc} \times N_{bpsc} \times N_{st} \times N_{rate}} \quad (6)$$

where $N_{LENGTH}$ is the packet length, $N_{sc}$ is the number of subcarriers, $N_{bpsc}$ is the number of bits to be mapped to one subcarrier, $N_{st}$ is the number of spatially multiplexed streams, and $N_{rate}$ is the coding rate.

The last symbol timing generation unit 308 uses the number of symbols calculated according to the Equation (6) and the current count of decoded bits to determine whether the symbol currently being processed is the last symbol or not. If the last symbol timing generation unit 308 determines that the current symbol is the last symbol, the last symbol timing generation unit 308 outputs a last symbol timing signal to the modulation unit 304.

The modulation unit 304 will be described next. The modulation unit 304 performs essentially the same processing as the modulation processing performed by the radio transmitter 100a.

FIG. 5 illustrates a configuration of the modulation unit 304. The modulation unit 304 comprises an encoding unit 201, an S/P conversion unit 202, interleaving units 501a and 501b, and mapping units 204a and 204b. The modulation unit 304 performs re-modulation processing of a tentative decision bit sequence b(k) output from the demodulation unit 303, including error-correction coding, interleaving where the data is rearranged, and mapping where the bit sequence is mapped to a complex plane, in the same manner as in the modulation processing performed by the radio transmitter 100a, and outputs a tentative decision transmitted signal $x^{[I]}(k)$ mapped to a complex plane consisting of I and Q signals.

Here, $x^{[I]}(k)$ is a column vector consisting of m elements. The m-th element (a tentative decision transmitted signal transmitted from the m-th antenna) of the column vector is denoted by $x^{[I]}m(k)$.

The interleaving unit 501a uses the bit data sequence from the S/P conversion unit 202 and the last symbol timing signal from the last symbol timing generation unit 308 to perform interleaving to reorder the input bit data sequence. The bit data sequence is rearranged using the same procedure as in the interleaving performed in the transmitter. The interleaving unit 501b performs the same processing as the interleaving unit 501a and outputs a bit data sequence.

The modulation unit 304 receives a tentatively decided decoding result b(k) output from the demodulation unit 303 and the last symbol timing signal output from the last symbol timing generation unit 308. In the present embodiment, the modulation unit 304 controls the timing of outputting a re-modulated signal on the basis of the timing signal output from the last symbol timing generation unit 308. That is, the interleaving units 501a and 501b output rearranged data sequences at regular intervals but, when the last symbol timing signal is input into them, the interleaving units 501a and 501b start outputting bit data sequences at the time when input of the error-correction decoded data of the last symbol is completed.

A replica generation unit 305 multiplies a tentative decision transmitted signal $x^{[I]}(k)$ output from the modulation unit 304 by a channel estimation value B to give fading introduced over the transmission channel according to Equation (7). The replica generation unit 305 generates a replica signal $y^{[I]}r(k)$ of the r-th stream of the received signal y(k).

[Expression 7]

$$y^{[I]}_r(k) = BG_r x^{[I]}(k) \quad (7)$$

Here, $G_r$ represents a matrix obtained from a unitary matrix of order M by making the diagonal elements of the r-th row in the rth column=0.

The interference cancellation unit 306 regards signals except the desired r-th transmitted stream signal from baseband signals y(k) output from the radio unit 103 as interference signals and uses the replica signal $y^{[I]}r(k)$ to cancel the interference signals to extract the desired r-th stream signal. The interference cancellation unit 306 obtains the signal $v_r^{[I]}(k)$ by cancelling the interference component of the r-th stream by

[Expression 8]

$$v_r^{[I]}(k) = y(k) - y^{[I]}(k) \quad (8)$$

Here, r is a natural number in the range from 1 to the number of transmitted streams m and $v_r^{[I]}(k)$ is a column vector having nr elements. The interference cancellation operation described above is performed for all streams to obtain an interference-cancelled signal $v_r^{[I]}(k)$. That is, the interference cancellation operation described above is performed for streams r=1, . . . , m.

The interference cancellation unit 306 then combines nr elements of the interference-cancelled signals $V_r^{[I]}(k)$. The nr elements may be combined using a method such as maximal ratio combining or MMSE (Minimum Mean Square Error) combining. If the maximal ratio combining method is used, the interference-cancelled signal $V_r^{[I]}(k)$ is multiplied by the complex conjugate transpose vector of the r-th column vector $b_r$ of the channel estimation value B to obtain the combined output $u_r^{[I]}(k)$ of the desired r-th stream as

[Expression 9]

$$u_r^{[I]}(k) = b_r^H v_r(k) \quad (9)$$

where superscript H represents the vector conjugate transpose. The combining operation is performed for all streams to obtain a combined interference-cancelled signal $u_r^{[I]}(k)$. Specifically, the combining operation described above is performed for r=1, . . . , m.

The combined interference-cancelled signal $u_r^{[I]}(k)$ output from the cancellation unit 306 is input into the demodulation unit 303, where demapping, deinterleaving, and error-correction decoding are applied to the interference-cancelled signal $u_r^{[I]}(k)$ and a decoded tentative decision bit sequence $b_r^{[I]}(k)$ is output.

FIG. 6 illustrates signal processing timing in the radio receiver 100. In FIG. 6, the horizontal axis represents time and processes applied to a received signal are illustrated along the vertical axis in order, from top to bottom. Each of the rectangles in FIG. 6 represents the time required for signal processing. FIG. 6 illustrates key processes in which delay occurs among the signal processes. Signal processes in which only short delay occurs is omitted from FIG. 6. Timing of the processes on the last four symbols (n, n−1, n−2, and n−3) is illustrated in the FIG. 6.

Iterative decoding that involves two iterations is illustrated in FIG. 6. The first iteration of the iterative decoding includes (1) Receiving process, (2) FFT process, (3) Deinterleaving process, and (4) Error-correction decoding process. The second iteration of the iterative decoding includes (5) Interleaving process, (6) Interference cancellation process, (7) Deinterleaving process, and (8) Error-correction decoding process.

Operation of the radio receiver 100 will be described below with reference to FIG. 6. In "(2) FFT process", fast Fourier transform is applied to each symbol of a received signal and fast-Fourier-transformed data is output. In the FFT process, all unit data to be processed needs to be temporally stored because the FFT process typically uses butterfly computation. Accordingly, output from the FFT process is delayed by the amount of time for receiving one symbol during the receiving process.

Demapping is applied to the fast-Fourier-transformed data. The amount of delay induced by the demapping is as short as a few operation clock cycles and therefore the demapping is omitted from FIG. 6.

"(3) Deinterleaving process" is performed on the demapped data. The deinterleaving process rearranges the data sequence within a unit of a certain number of bits. Typically, data are rearranged symbol-wise. It is generally known that randomly rearranging data significantly improves characteristics. However, it is difficult to randomly rearrange data by hardware. To accomplish deinterleaving that rearranges data orderly and yet significantly improves characteristics, data of one symbol needs to be temporarily stored in memory. Therefore, since one symbol of input data is stored before outputting deinterleaved data, the output of the deinterleaving process is delayed by the amount of time it takes to process one symbol in the FFT process.

Then, "(4) Error-correction decoding process" is performed on the deinterleaved data. The Viterbi decoding algorithm is used as an example of the error-correction decoding algorithm in the present embodiment. It is generally known that the Viterbi decoding requires data of a certain path memory length in order to obtain the result of decoding (for example see "Easy high coding rate convolutional coding of Viterbi decoding and its performance characteristics" by Yutaka Yasuda, Yasuo Hirata, and Akira Ogawa, Shingakuron (B), Vol. J64-B, pp. 573-580, 1981). Therefore, data decoded from the first input data is output after one path memory length of data has been input, as illustrated in FIG. 6. In OFDM (orthogonal frequency division multiplexing) modulation, a guard interval, which is typically a copy of a transmitted signal, is provided. Accordingly, periods where no signal is transmitted occur due to removal of the guard intervals as depicted in FIG. 6. In symbol-by-symbol decoding, when data of one symbol is input, the amount of decoded data resulting from decoding of the symbol is the amount of data of the symbol minus the amount of data in path memory, because part of the data remains in the path memory. Accordingly, error-correction-decoded data corresponding to one symbol is output when the data of the next symbol of the path memory length is input. For example, output of decoded data of the n−3-th symbol is completed at time t1.

Then, the error-correction-decoded data is input into "(5) Interleaving process", where interleaving is applied to rearrange the input, error-correction-decoded data, and the result is output. In the interleaving process, data of one symbol is stored for the same reason as in the deinterleaving process. Accordingly, the interleaving process does not start until completion of input of the decoded data corresponding to one symbol. As has been described with respect to the error-correction decoding process, the result of error-correction decoding of one symbol cannot be output before the next symbol of data is input. Therefore, the amount of the interleaving process delay is equal to the sum of the period of data of one symbol, the guard interval period, and the period of the data of the path memory length in the next symbol. For example, the interleaving process on the n−3-th symbol is started at time t1.

In the Viterbi decoding of the last symbol, data of a given path memory length for obtaining the result of decoding is not available. Therefore, known data is typically added to the end of data input in Viterbi decoding. The use of known data enables correct decoding without using data of a give path memory length. Thus, in the interleaving process on the last symbol, error-correction decoded data can be obtained using the last symbol alone. In the present embodiment, a signal output from the last symbol timing generation unit 308 is used. When a symbol to be subjected to interleaving is found to be the last symbol, interleaving of the symbol is started upon completion of the input of the process result of that symbol, thereby reducing wait time by one guard interval. That is, in the interleaving process on the first symbol through the last symbol but one, interleaved data is output at symbol intervals. For the last symbol, output from the interleaving is started at timing earlier than the symbol interval.

Then, mapping is applied to the interleaved data. The amount of delay induced by the mapping is as short as a few operation clock cycles. Therefore, the mapping process is omitted from FIG. 6.

Then, in "(6) Interference cancellation process", the mapped data is used to cancel an interference component of the received signal. Since the interference cancellation process involves operations such as multiplication, division, and subtraction, the amount of delay time is tens of clock cycles as illustrated in FIG. 6. The cancellation is applied to input data in sequence. Accordingly, input data is given an equal amount of process delay before the interference-cancelled data is output. Therefore, the interval between the last symbol and the previous symbol at the time of output is the same as the interval at the time of input.

Then, demapping is performed on the data subjected to the cancellation process. The amount of delay induced by the demapping process is as short as a few operation clock cycles and therefore the demapping process is omitted from FIG. 6.

Then, "(7) Deinterleaving process" is performed on the demapped data. The amount of delay induced by the deinterleaving process is equal to the input time it takes to stored data of one symbol for rearranging the data as has been described above. For the last symbol, delay time can be reduced by the amount of time of guard interval at the output of the deinterleaving process because the last symbol was output from the interleave process ahead of one symbol interval.

Then, "(8) Error-correction decoding process" is performed on the deinterleaved data. The amount of delay induced by the error-correction decoding is the same as in the first decoding process as illustrated in FIG. 6. For the last symbol, the data is input without a wait time equivalent to a guard interval. Therefore, the time required for error-correction decoding of all data is process delay time $T_{delay}$ that is shorter than the time required for equivalent conventional processing by the amount of wait time caused by the guard interval.

As can be seen from the foregoing, the radio receiver according to the present embodiment is capable of reducing the output wait time of the interleaving process in the iterative decoding of the last symbol. FIG. 11 illustrates timing of processes in conventional iterative decoding. As illustrated in FIG. 11, the interleaving process on the last symbol is performed after wait time equivalent to a guard interval. In the present embodiment, the wait time in the interleaving process of the last symbol is removed to reduce the receiving process delay time $T_{delay}$.

Second Embodiment

A radio receiver according to a second embodiment will be described next. The radio receiver according to the second embodiment uses parallel interference canceller (PIC) to perform iterative decoding. The basic configuration of the radio receiver of the second embodiment is similar to that of the radio receiver 100 of the first embodiment (see FIG. 1) with the difference being the configuration of the baseband demodulation unit 104a.

FIG. 8 illustrates a baseband demodulation unit 104a of the receiver according to the second embodiment. The same components as those of the baseband demodulation unit 104 illustrated in FIG. 1 are labeled the same reference numerals and repeated description of the components will be omitted.

As illustrated in FIG. 8, a last symbol timing generation unit 308 in the second embodiment inputs a last symbol timing signal into a demodulation unit 801 as well. The demodulation unit 801 performs demapping in which points mapped on a complex plane consisting of I and Q signals are converted to the likelihood of each bit, deinterleaving in which the demapped likelihood sequence is rearranged and output, and error-correction decoding of the likelihood and outputs the result of the decoding. The demodulation unit 801 uses a stream signal from a signal separation unit 302, an interference-cancelled signal from a cancellation unit 306, and a last symbol timing signal from a last signal timing generation unit 308 to perform the demapping, interleaving, and error-correction decoding processes described above.

FIG. 9 illustrates a configuration of the demodulation unit 801 provided in the baseband demodulation unit 104. The same components as those of the demodulation unit 303 depicted in FIG. 9 are labeled the same reference numerals and repeated description of those components will be omitted. As illustrated in FIG. 9, the demodulation unit 801 comprises, between a P/S conversion unit 403 and an error-correction decoding unit 404, a likelihood storage 901 for storing a likelihood obtained in the previous decoding and to be input into the error-correction decoding unit 404 and a likelihood selection unit 902 which selects one of likelihood from the likelihood storage 901 and likelihood obtained by the current decoding.

The likelihood selection unit 902 selects, on the basis of the last symbol timing signal output from the last symbol timing generation unit 308, one of the likelihood output from the P/S conversion unit 403 and the likelihood obtained in the previous decoding which is output from the likelihood storage 901, and inputs the selected likelihood into the error-correction decoding unit 404. If the last symbol timing signal does not indicate the last symbol, the likelihood selection unit 902 selects the likelihood obtained in the current decoding and outputs the likelihood. If the last symbol timing signal indicates the last symbol, the likelihood selection unit 902 selects the likelihood obtained in the current decoding for a bit for which likelihood in the current decoding exists and selects likelihood obtained in the previous decoding for a bit for which likelihood in the current decoding does not exist. Likelihood in the current decoding may not exist because deinterleaving was started earlier in order to reduce process delay and data in one symbol is not completely stored and part of the data in one symbol does not exist.

FIG. 10 illustrates signal processing timing in the radio receiver according to the second embodiment. The vertical and horizontal axes and the processes depicted along the vertical axis in FIG. 10 are the same as those in FIG. 6. It is assumed in the second embodiment that the operation clock rate of the radio receiver 100 is higher than that of the radio receiver 100 of the first embodiment. In FIG. 10, the time required for each process is shorter than that in the example illustrated in FIG. 6.

Since "(5) Interleaving process" time is shorter, even though the interleaving process of the last symbol is started upon completion of "(4) Error-correction decoding process", a time gap results between the completion of the interleaving process of the previous symbol and the completion of the interleaving process of the last symbol as illustrated in FIG. 10. Therefore, if deinterleaving in "(7) Deinterleaving process" was started after the result of "(6) Cancellation process" has been output, a time gap 1001 would result between the last symbol and the previous symbol.

In the present embodiment, the last symbol timing signal is used to indicate to the demodulation unit 801 that a symbol is the last symbol. In response to the last symbol timing signal, the likelihood selection unit 902 reads the likelihood stored in the likelihood storage 901 which has been output from the first "(3) Deinterleaving process" and inputs the likelihood into the error-correction decoding unit 404. With this, the error-correction decoding unit 404 can start "(7) Deinterleaving process" before completion of "(6) Cancellation process". Accordingly, "(7) Deinterleaving process" is started earlier by the time gap 1001 and consequently "(8) Error-correction decoding process" is started earlier by the time gap 1001.

Since "(7) Deinterleaving process" starts before completion of "(6) Cancellation process", data in the shaded portion 1002 of the last symbol n in FIG. 10 is not available in "(7) Deinterleaving process". While the likelihood for the last portion of the data is unavailable in the example in FIG. 10, a portion for which likelihood is unavailable can be in some midpoint of data output of the same symbol or various positions in the same symbol depending on interleaving rules. In the present embodiment, the demodulation unit 801 uses the likelihood obtained in the previous decoding and stored in the likelihood storage 901 for a missing portion of data that occurs because "(6) Cancellation process" of the portion has not been completed.

In the present embodiment, data is not input in the data interleaving units 402a and 402b during the deinterleaving process. That is, when "(7) Deinterleaving process" of the last symbol n is started, input of data in the deinterleaving units 402a and 402b is stopped and therefore the last data output from "(6) Cancellation process" (the data to be input during the time gap 1001) cannot be input. For that data, the likelihood obtained in the previous decoding process is used. In an alternative implementation, deinterleaving units can receive data output from the cancellation process while deinterleaving data. In this case, the data to be input in the time gap 1001 can be input during the deinterleaving process. Likelihood that could not be obtained in the current decoding process at the start of the deinterleaving process may be able to be obtained by the time of start of rearrangement of data in the deinterleaving process and the likelihood may be able to be used to perform the deinterleaving process. If so, the newly calculated likelihood can be used in stead of the likelihood calculated previously, which can improve the receiving performance.

The radio receiver according to the second embodiment starts deinterleaving of the last symbol earlier to reduce the process delay time of the entire receiving process. The radio receiver according to the second embodiment uses the likelihood calculated in the previous decoding process for the deinterleaving to minimize performance penalty due to the early start of the deinterleaving.

While radio receivers and radio receiving methods according to the present invention have been described in detail with respect to embodiments, the present invention is not limited to the embodiments described above.

While the embodiments of the present invention preferable as of the date of preparation of this application have been described above, it will be understood that various modifications can be made to the embodiments and it is intended to cover in the attached claims all such modifications and variations as fall within the true spirit and scope of the present invention.

INDUSTRIAL APPLICABILITY

The present invention has the advantageous effect of reducing the time required for signal receiving processing and therefore is useful for application to a radio communication device or the like that performs iterative decoding of a received radio signal.

The invention claimed is:

1. A radio receiver which performs iterative decoding of a received signal, comprising:
   a receiving unit receiving a signal on a symbol-by-symbol basis;
   a demodulation unit demodulating the received signal;
   a last symbol timing generation unit generating a last symbol timing signal indicating the timing of a last symbol on the basis of the signal demodulated by the demodulation unit;
   a modulation unit modulating the signal demodulated by the demodulation unit; and
   an interference cancellation unit cancelling an interference component of the received signal using a replica signal generated on the basis of the signal modulated by the modulation unit;
   wherein the modulation unit controls the timing of rearrangement of a data sequence on the basis of the last symbol timing signal.

2. The radio receiver according to claim 1, wherein the demodulation unit comprises an error-correction decoding unit performing error-correction decoding of a symbol using a portion of data included in a next symbol; and
   for a symbol that is not the last symbol, the modulation unit starts rearrangement of the data sequence after predetermined time has elapsed since the completion of input of a result of processing of the symbol, and when the modulation unit determines, on the basis of the last symbol timing, that a symbol is the last symbol, the modulation unit starts rearrangement of the data sequence at the timing when the modulation unit has detected completion of input of a result of processing of the last symbol.

3. The radio receiver according to claim 2, wherein the demodulation unit comprises the likelihood storage for storing a likelihood used by the error-correction decoding unit for a previous decoding; and
   a likelihood selection unit selecting, on the basis of the last symbol timing, a likelihood obtained in the previous decoding or a likelihood obtained in a current decoding; and
   the likelihood selected by the likelihood selection unit is input in the error-correction decoding unit.

4. The radio receiver according to claim 1, wherein the receiving unit receives a spatially multiplexed signal;
   the radio receiver comprises a signal separation unit separating the signal received by the receiving unit; and
   the signal separated by the signal separation unit is input into the demodulation unit.

5. The radio receiver according to claim 2, wherein the receiving unit receives a spatially multiplexed signal;
   the radio receiver comprises a signal separation unit separating the signal received by the receiving unit; and
   the signal separated by the signal separation unit is input into the demodulation unit.

6. The radio receiver according to claim 3, wherein the receiving unit receives a spatially multiplexed signal;
   the radio receiver comprises a signal separation unit separating the signal received by the receiving unit; and
   the signal separated by the signal separation unit is input into the demodulation unit.

7. A radio receiving method for performing iterative decoding of a received signal, comprising the steps of:
   receiving a signal on a symbol-by-symbol basis;
   demodulating the received signal
   generating a last symbol timing signal indicating the timing of a last symbol on the basis of the demodulated signal;
   modulating the demodulated signal to generate a modulated signal while controlling the timing of rearrangement of a data sequence on the basis of the last symbol timing signal; and
   cancelling an interference component of the received signal using a replica signal generated on the basis of the modulated signal.

* * * * *